(12) United States Patent
Tsai et al.

(10) Patent No.: US 11,546,820 B2
(45) Date of Patent: Jan. 3, 2023

(54) ENHANCED HANDOVER METHODS AND APPARATUSES USING THE SAME

(71) Applicant: MEDIATEK INC., Hsinchu (TW)

(72) Inventors: Chun-Fan Tsai, Hsinchu (TW); Yuanyuan Zhang, Beijing (CN)

(73) Assignee: MEDIATEK INC., Hsinchu (TW)

(*) Notice: Subject to any disclaimer, the term of this patent is extended or adjusted under 35 U.S.C. 154(b) by 0 days.

(21) Appl. No.: 17/289,064

(22) PCT Filed: Oct. 17, 2019

(86) PCT No.: PCT/CN2019/111655
§ 371 (c)(1),
(2) Date: Apr. 27, 2021

(87) PCT Pub. No.: WO2020/088260
PCT Pub. Date: May 7, 2020

(65) Prior Publication Data
US 2021/0410037 A1 Dec. 30, 2021

Related U.S. Application Data

(60) Provisional application No. 62/754,648, filed on Nov. 2, 2018.

(51) Int. Cl.
*H04W 4/00* (2018.01)
*H04W 36/18* (2009.01)
(Continued)

(52) U.S. Cl.
CPC ........... *H04W 36/18* (2013.01); *H04W 36/08* (2013.01); *H04W 60/06* (2013.01); *H04W 76/30* (2018.02)

(58) Field of Classification Search
CPC ..... H04W 36/18; H04W 36/08; H04W 60/06; H04W 76/30; H04W 36/023
(Continued)

(56) References Cited

U.S. PATENT DOCUMENTS 10,959,138 B2  3/2021  Liu et al.
2015/0105084 A1  4/2015  Bontu et al.
(Continued)

FOREIGN PATENT DOCUMENTS

CN  107911201 A  4/2018
WO  2017/169229 A1  10/2017
(Continued)

OTHER PUBLICATIONS

International Search Report and Written Opinion dated Jan. 3, 2020, issued in application No. PCT/CN2019/111655.
(Continued)

*Primary Examiner* — Marcos Batista
(74) *Attorney, Agent, or Firm* — McClure, Qualey & Rodack, LLP

(57) ABSTRACT

A User Equipment (UE) including a wireless transceiver and a controller is provided. The wireless transceiver performs wireless transmission and reception to and from a first cellular station and a second cellular station. The controller continues to send or receive UP data to or from the first cellular station via the wireless transceiver after receiving a handover command message for a handover of the UE from the first cellular station to the second cellular station, and receives a Radio Resource Control (RRC) request message from the second cellular station via the wireless transceiver after sending a handover complete message to the second cellular station. Also, the controller detaches from the first cellular station in response to receiving the RRC request message.

15 Claims, 6 Drawing Sheets

(51) Int. Cl.
*H04W 76/30* (2018.01)
*H04W 36/08* (2009.01)
*H04W 60/06* (2009.01)

(58) Field of Classification Search
USPC .................................. 370/331; 455/436–437
See application file for complete search history.

(56) References Cited

U.S. PATENT DOCUMENTS

2019/0116536 A1* 4/2019 Xu ........................ H04W 36/02
2020/0045595 A1* 2/2020 Comstock ............. H04W 36/36

FOREIGN PATENT DOCUMENTS

WO      2017/180258 A1   10/2017
WO      WO-2017180258 A1 * 10/2017  ........ H04W 36/0072

OTHER PUBLICATIONS

Chinese language office action dated Aug. 24, 2020, issued in application No. TW 108137606.

* cited by examiner

ENHANCED HANDOVER METHODS AND APPARATUSES USING THE SAME

CROSS REFERENCE TO RELATED APPLICATIONS

This Application claims priority of U.S. Provisional Application No. 62/754,648, filed on Nov. 2, 2018, the entirety of which is incorporated by reference herein.

TECHNICAL FIELD

The application generally relates to mobile communications, and more particularly, to enhanced handover methods and apparatuses using the same.

BACKGROUND

In a typical mobile communication environment, a UE (which is also called a Mobile Station (MS)), such as a mobile telephone (also known as a cellular phone or a cell phone), or a tablet Personal Computer (PC) with wireless communications capability, may communicate voice and/or data signals with one or more service networks. The wireless communications between the UE and the service networks may be performed using various cellular technologies, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, Time Division LTE (TD-LTE) technology, and others.

These cellular technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In 5G NR or 4G LTE, a handover of a UE from a source cellular station to a target cellular station will inevitably cause interruption to the ongoing data service. During the service interruption, both Uplink (UL) and Downlink (DL) data could not be delivered from and to the UE. Typically, the service interruption may last for 15 to 20 milliseconds (ms), and this may result in poor user experience, especially when the ongoing data service is a delay sensitive service.

SUMMARY

In order to solve the aforementioned problem, the present application proposes an enhanced handover procedure to reduce the time of service interruption.

In a first aspect of the application, a User Equipment (UE) comprising a wireless transceiver and a controller is provided. The wireless transceiver is configured to perform wireless transmission and reception to and from a first cellular station and a second cellular station. The controller is configured to continue to send or receive User Plane (UP) data to or from the first cellular station via the wireless transceiver after receiving a handover command message for a handover of the UE from the first cellular station to the second cellular station, receive a Radio Resource Control (RRC) request message from the second cellular station via the wireless transceiver after sending a handover complete message to the second cellular station, and detach from the first cellular station in response to receiving the RRC request message.

In a second aspect of the application, an enhanced handover method for a UE is provided. The enhanced handover method comprises the steps of: continuing to send or receive UP data to or from a first cellular station after receiving a handover command message for a handover of the UE from the first cellular station to a second cellular station; receiving an RRC request message from the second cellular station after sending a handover complete message to the second cellular station; and detaching from the first cellular station in response to receiving the RRC request message.

In a third aspect of the application, a cellular station, serving as a source cellular station for a handover of a UE to a target cellular station is provided. The cellular station comprises a wired transceiver, a wireless transceiver, and a controller. The wired transceiver is configured to provide wired communications with the target cellular station and a core network. The wireless transceiver is configured to perform wireless transmission and reception to and from the UE. The controller is configured to continue to send or receive UP data to or from the UE via the wireless transceiver after sending a handover command message to the UE, and stop sending DL UP data received from the core network to the UE in response to receiving a SN status request message from the target cellular station via the wired transceiver.

Other aspects and features of the present application will become apparent to those with ordinarily skill in the art upon review of the following descriptions of specific embodiments of the UEs, cellular stations, and enhanced handover methods.

BRIEF DESCRIPTION OF DRAWINGS

The application can be more fully understood by reading the subsequent detailed description and examples with references made to the accompanying drawings, wherein.

DETAILED DESCRIPTION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
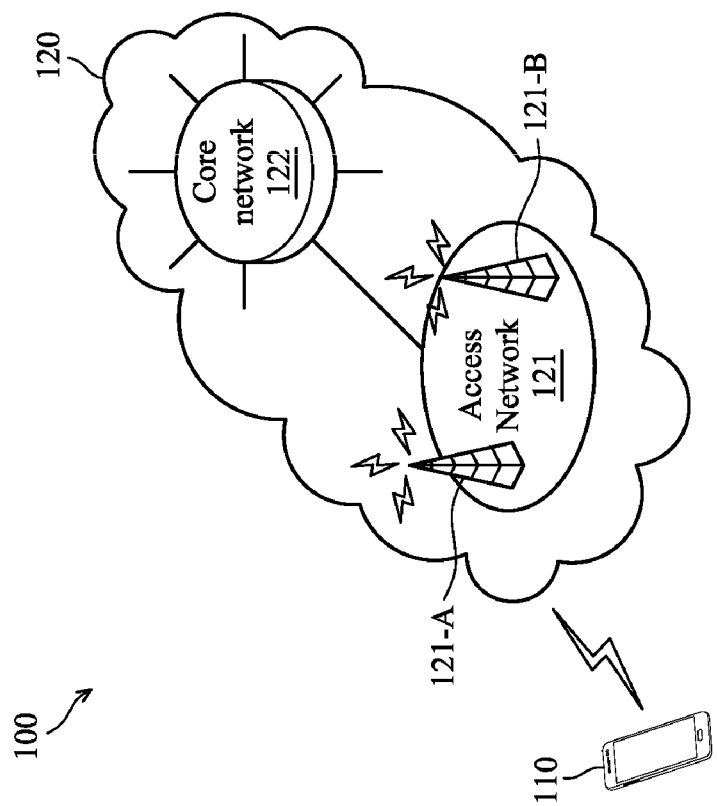
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 may include a User Equipment (UE) 110 and a service network 120, wherein the UE 110 may be wirelessly connected to the service network 120 for obtaining mobile services, such as data services.

The UE 110 may be a feature phone, a smartphone, a panel Personal Computer (PC), a laptop computer, or any wireless communication device supporting the cellular technology (e.g., 4G LTE or 5G NR technology) utilized by the service network 120.

In another embodiment, the UE 110 may support more than one cellular technology. For example, the UE may support the 5G NR technology and a legacy cellular technology, such as the 4G LTE-based (e.g., LTE/LTE-A/TD-LTE) technology, or the 3G WCDMA technology.

The service network 120 may include an access network 121 and a core network 122. The access network 121 is responsible for processing radio signals, terminating radio protocols, and connecting the UE 110 with the core network 122. The core network 122 is responsible for performing mobility management, network-side authentication, and interfaces with public/external networks (e.g., the Internet). Specifically, the access network 121 may include multiple cellular stations, such as the cellular stations 121-A and 121-B, while the core network 122 may include one or more network nodes for carrying out said functions.

In one embodiment, the service network 120 may be a 5G NR network, and the access network 121 and the core network 122 may be a Next Generation-Radio Access Network (NG-RAN) and a Next Generation-Core Network (NG-CN), respectively.

A NG-RAN may include one or more next generation NodeBs (gNBs), which support high frequency bands (e.g., above 24 GHz), and each gNB may further include one or more Transmission Reception Points (TRPs), wherein each gNB or TRP may be referred to as a 5G cellular station (e.g., the cellular stations 121-A and 121-B). Some gNB functions may be distributed across different TRPs, while others may be centralized, leaving the flexibility and scope of specific deployments to fulfill the requirements for specific cases.

A 5G cellular station may form one or more cells with different Component Carriers (CCs) for providing mobile services to the UE 110. For example, the UE 110 may camp on one or more cells formed by one or more gNBs or TRPs and send and/or receive User Plane (UP) data (or called user data) to and/or from the service network 120 via the cell(s), wherein the camped cell(s) may be referred to as serving cells, including a Primary cell (PCell) and one or more Secondary cells (SCells).

A NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

In another embodiment, the service network 120 may be a 4G LTE/LTE-A/TD-LTE network, and the access network 121 and the core network 122 may be an Evolved-Universal Terrestrial Radio Access Network (E-UTRAN) and an Evolved Packet Core (EPC), respectively.

An E-UTRAN may include one or more evolved NBs (eNBs), wherein each eNB may be a macro eNB, femto eNB, or pico eNB, and may be referred to as a 4G cellular station (e.g., the cellular stations 121-A and 121-B).

A 4G cellular station may form at least one cell to provide mobile services to the UE 110. For example, the UE 110 may camp on one or more cells formed by one or more eNBs and send and/or receive UP data to and/or from the service network 120 via the cell(s), wherein the camped cell may be referred to as a serving cell.

An EPC may include a Home Subscriber Server (HSS), Mobility Management Entity (MME), Serving Gateway (S-GW), Packet Data Network Gateway (PDN-GW or P-GW), and IP Multimedia Subsystem (IMS) server.

It should be understood that the wireless communication environment 100 described in the embodiment of FIG. 1 are for illustrative purposes only and are not intended to limit the scope of the application.

For example, the wireless communication environment 100 may include both a 5G NR network and a legacy network (e.g., a 4G LTE/LTE-A/TD-LTE network, or a 3G WCDMA network), and the UE 110 may be wirelessly connected to both the 5G NR network and the legacy network.

Figure 2:
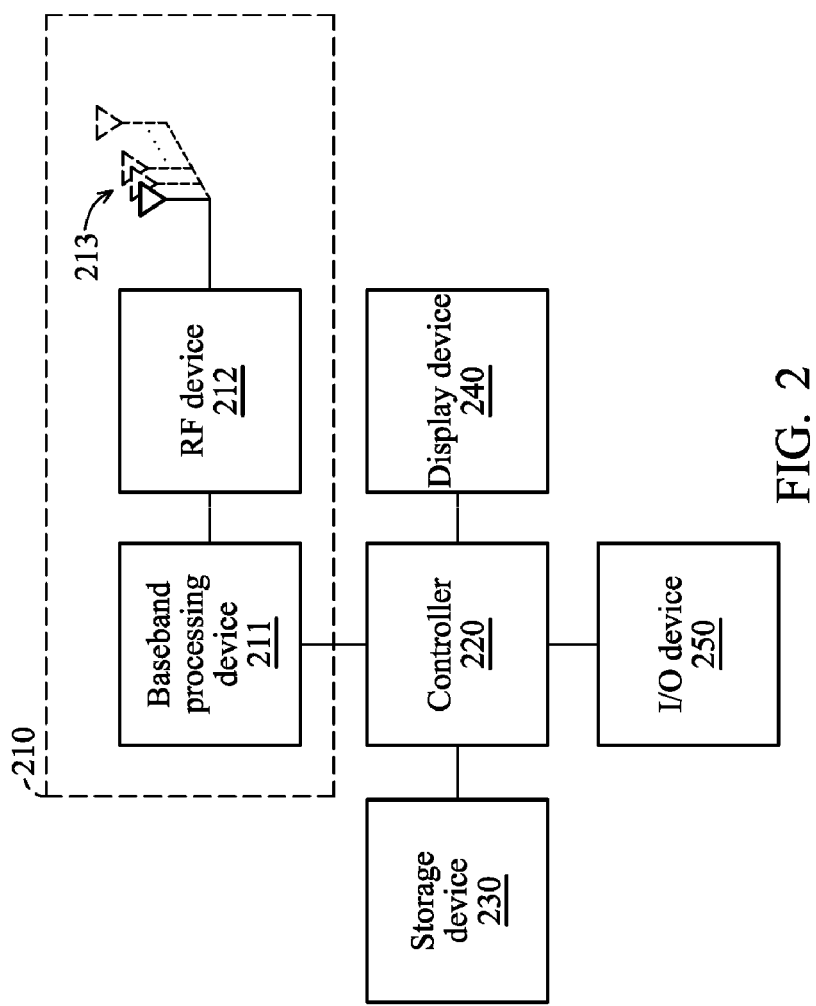
FIG. 2 is a block diagram illustrating a UE according to an embodiment of the application.

FIG. 2 is a block diagram illustrating a UE according to an embodiment of the application.

As shown in FIG. 2, a UE (e.g., the UE 110) may include a wireless transceiver 210, a controller 220, a storage device 230, a display device 240, and an Input/Output (I/O) device 250.

The wireless transceiver 210 is configured to perform wireless transmission and reception to and from the cellular stations 121-A and 121-B.

Specifically, the wireless transceiver 210 may include a baseband processing device 211, a Radio Frequency (RF) device 212, and antenna 213, wherein the antenna 213 may include an antenna array for beamforming.

The baseband processing device 211 is configured to perform baseband signal processing and control the communications between subscriber identity card(s) (not shown) and the RF device 212. The baseband processing device 211 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 212 may receive RF wireless signals via the antenna 213, convert the received RF wireless signals to baseband signals, which are processed by the baseband processing device 211, or receive baseband signals from the baseband processing device 211 and convert the received baseband signals to RF wireless signals, which are later transmitted via the antenna 213. The RF device 212 may also contain multiple hardware devices to perform radio frequency conversion. For example, the RF device 212 may comprise a mixer to multiply the baseband signals with a carrier oscillated in the radio frequency of the supported cellular technologies, wherein the radio frequency may be any radio frequency (e.g., 30 GHz~300 GHz for mmWave) utilized in the 5G NR technology, or may be 900 MHz, 2100 MHz, or 2.6 GHz utilized in the 4G LTE/LTE-A/TD-LTE technology, or another radio frequency, depending on the cellular technology in use.

The controller 220 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 210 for wireless communication with the cellular stations 121-A and 121-B, storing and retrieving data (e.g., program code) to and from the storage device 230, sending a series of frame data (e.g. representing text messages, graphics, images, etc.) to the display device 240, and receiving user inputs or outputting signals via the I/O device 250.

In particular, the controller 220 coordinates the aforementioned operations of the wireless transceiver 210, the storage device 230, the display device 240, and the I/O device 250 for performing the enhanced handover method of the present application.

In another embodiment, the controller 220 may be incorporated into the baseband processing device 211, to serve as a baseband processor.

As will be appreciated by persons skilled in the art, the circuits of the controller 220 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 230 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the enhanced handover method of the present application. For example, the enhanced handover method may be implemented as part of a communication protocol, such as the communication protocol for 5G mobile standard.

The display device 240 may be a Liquid-Crystal Display (LCD), a Light-Emitting Diode (LED) display, an Organic LED (OLED) display, or an Electronic Paper Display (EPD), etc., for providing a display function. Alternatively, the display device 240 may further include one or more touch sensors disposed thereon or thereunder for sensing touches, contacts, or approximations of objects, such as fingers or styluses.

The I/O device 250 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application.

For example, a UE may include more components, such as a power supply, and/or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, the UE may not include the display device 240 and/or the I/O device 250.

Figure 3:
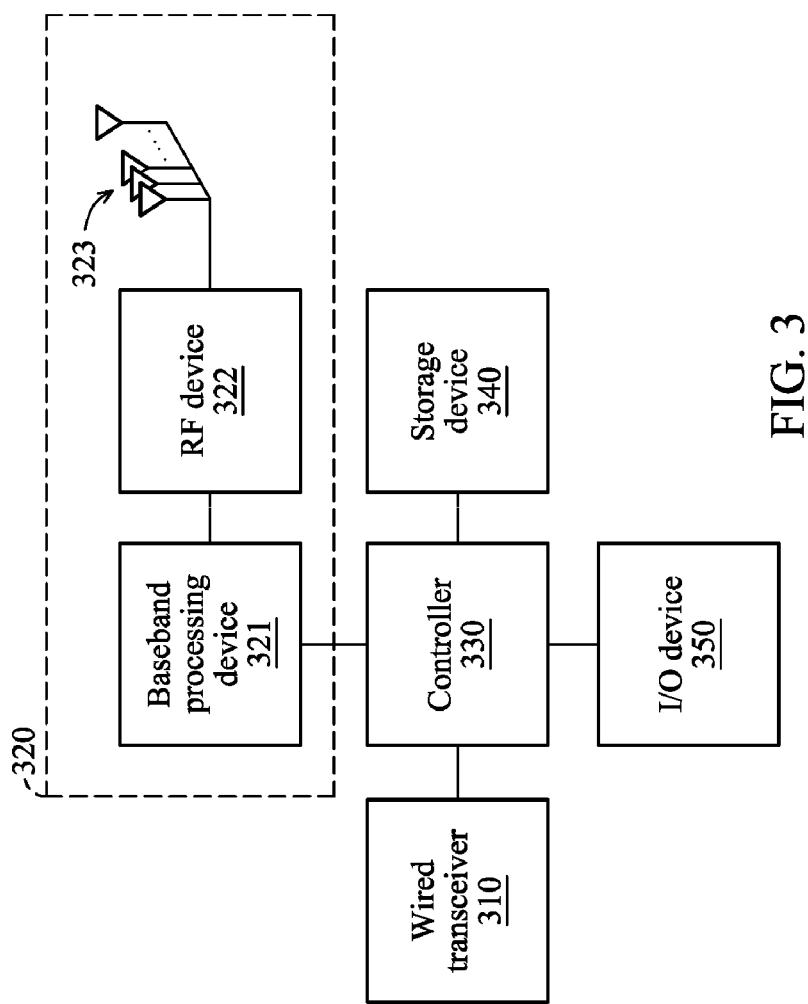
FIG. 3 is a block diagram illustrating a cellular station according to an embodiment of the application.

FIG. 3 is a block diagram illustrating a cellular station according to an embodiment of the application.

As shown in FIG. 3, a cellular station (e.g., the cellular stations 121-A or 121-B) may include a wired transceiver 310, a wireless transceiver 320, a controller 330, a storage device 340, and an I/O device 350.

The wired transceiver 310 is configured to provide wired communications with other cellular stations (e.g., the cellular stations 121-A or 121-B) and the core network 122.

For example, the wired transceiver 310 may include a cable modem, an Asymmetric Digital Subscriber Line (ADSL) modem, a Fiber-Optic Modem (FOM), and/or an Ethernet interface.

The wireless transceiver 320 is configured to perform wireless transmission and reception to and from the UE 110.

Specifically, the wireless transceiver 320 may include a baseband processing device 321, an RF device 322, and antenna 323, wherein the antenna 323 may include an antenna array for beamforming.

The baseband processing device 321 is configured to perform baseband signal processing. The baseband processing device 321 may contain multiple hardware components to perform the baseband signal processing, including ADC/DAC, gain adjusting, modulation/demodulation, encoding/decoding, and so on.

The RF device 322 may receive RF wireless signals via the antenna 323, convert the received RF wireless signals to baseband signals, which are processed by the baseband processing device 321, or receive baseband signals from the baseband processing device 321 and convert the received baseband signals to RF wireless signals, which are later transmitted via the antenna 323. The RF device 322 may also contain multiple hardware devices to perform radio frequency conversion. For example, the RF device 322 may comprise a mixer to multiply the baseband signals with a carrier oscillated in the radio frequency of the supported cellular technologies, wherein the radio frequency may be any radio frequency (e.g., 30 GHz~300 GHz for mmWave) utilized in the 5G NR technology, or may be 900 MHz, 2100 MHz, or 2.6 GHz utilized in the 4G LTE/LTE-A/TD-LTE technology, or another radio frequency, depending on the cellular technology in use.

The controller 330 may be a general-purpose processor, an MCU, application processor, DSP, GPU, HPU, NPU, or the like, which includes various circuits for providing the functions of data processing and computing, controlling the wired transceiver 310 for wired communications with other cellular stations and the core network 122, controlling the wireless transceiver 320 for wireless communication with the UE 110, storing and retrieving data (e.g., program code)

to and from the storage device 340, and receiving user inputs or outputting signals via the I/O device 350.

In particular, the controller 330 coordinates the aforementioned operations of the wired transceiver 310, the wireless transceiver 320, the storage device 340, and the I/O device 350 for performing the enhanced handover method of the present application.

In another embodiment, the controller 330 may be incorporated into the baseband processing device 321, to serve as a baseband processor.

As will be appreciated by persons skilled in the art, the circuits of the controller 330 will typically include transistors that are configured in such a way as to control the operation of the circuits in accordance with the functions and operations described herein. As will be further appreciated, the specific structure or interconnections of the transistors will typically be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 340 may be a non-transitory machine-readable storage medium, including a memory, such as a FLASH memory or a NVRAM, or a magnetic storage device, such as a hard disk or a magnetic tape, or an optical disc, or any combination thereof for storing data, instructions, and/or program code of applications, communication protocols, and/or the enhanced handover method of the present application. For example, the enhanced handover method may be implemented as part of a communication protocol, such as the communication protocol for 5G mobile standard.

The I/O device 350 may include one or more buttons, a keyboard, a mouse, a touch pad, a video camera, a microphone, and/or a speaker, etc., to serve as the MMI for interaction with users.

It should be understood that the components described in the embodiment of FIG. 3 are for illustrative purposes only and are not intended to limit the scope of the application.

For example, a cellular station may include more components, such as a power supply, and/or a display device, wherein the power supply may be a mobile/replaceable battery providing power to all the other components of the cellular station, and the display device may an LCD/LED/OLED/EPD for providing a display function.

Figure 4:
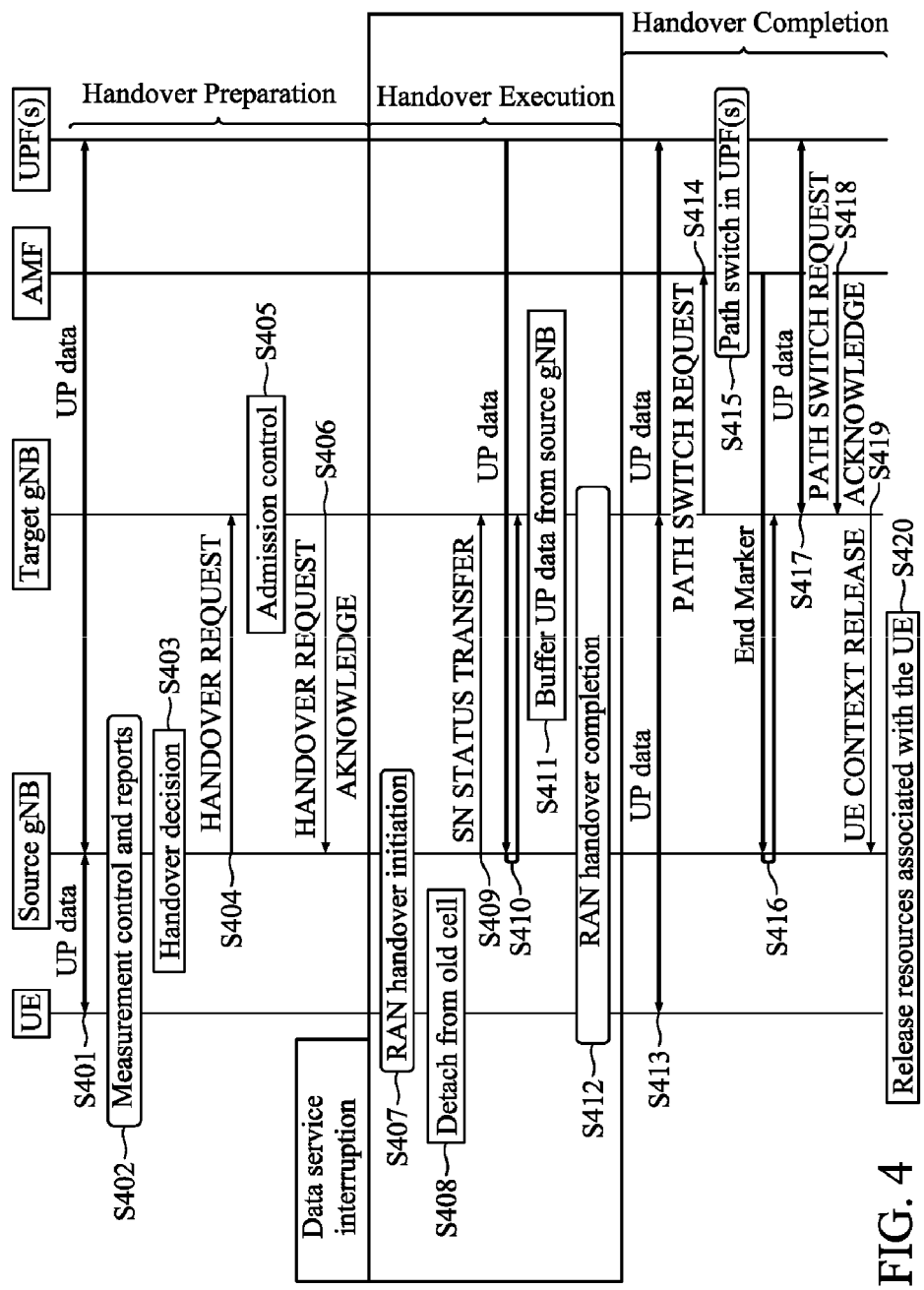
FIG. 4 is a message sequence chart illustrating a conventional handover procedure for the 5G NR technology.

FIG. 4 is a message sequence chart illustrating a conventional handover procedure for the 5G NR technology.

In step S401, a conventional UE is initially registered to a conventional 5G NR network and is sending and/or receiving UP data to and/or from the 5G NR network via the serving gNB (i.e., the source gNB).

In step S402, the source gNB configures the UE to perform measurements on the serving gNB and neighboring gNBs, and the UE reports the measurement results to the source gNB according to the measurement configuration.

In step S403, the source gNB decides to initiate a handover of the UE, based on the measurement report received from the UE and the Radio Resources Management (RRM) information.

In step S404, the source gNB sends a Handover Request message to the target gNB passing a transparent Radio Resource Control (RRC) container with necessary information to prepare the handover at the target side.

In step S405, the target gNB performs admission control. Slice-aware admission control shall be performed if the slice information is sent to the target gNB. If the PDU sessions are associated with non-supported slices the target gNB shall reject such PDU sessions.

In step S406, the target gNB prepares the handover and sends a HANDOVER REQUEST ACKNOWLEDGE message to the source gNB, which includes a transparent container to be sent to the UE as an RRC message to perform the handover.

In step S407, the source gNB initiates a handover by sending an RRCReconfiguration message to the UE, which includes the information required to access the target cell.

In step S408, the UE releases the configuration of the source gNB and detaches from the source gNB.

In step S409, the source gNB sends a Sequence Number (SN) STATUS TRANSFER message to the target gNB.

In step S410, the source gNB forwards the buffered UP data and new UP data received from the core network to the target gNB.

In step S411, the target gNB buffers the UP data from the source gNB.

In step S412, the UE synchronizes to the target gNB and completes the handover procedure by sending an RRCReconfigurationComplete message to target gNB.

Please note that, during the handover execution phase (steps S407~412), the data service is interrupted and the UE may experience a service delay for 15 to 20 ms.

In step S413, the target gNB sends the buffered DL UP data and new DL UP data to the UE, and receives UL UP data from the UE.

In step S414, the target gNB sends a PATH SWITCH REQUEST message to AMF to trigger the core network to switch the DL data path towards the target gNB and to establish an NG-C interface instance towards the target gNB.

In step S415, the core network entities, such as the AMF and UPF, switches the DL data path towards the target gNB.

In step S416, the AMF sends one or more "end marker" packets on the old path to the source gNB which further forwards the "end marker" packets to the target gNB.

In step S417, the UP data delivery between the UE and the core network is performed via the target gNB.

In step S418, the AMF confirms the PATH SWITCH REQUEST message with a PATH SWITCH REQUEST ACKNOWLEDGE message to the target gNB.

In step S419, upon reception of the PATH SWITCH REQUEST ACKNOWLEDGE message from the AMF, the target gNB sends a UE CONTEXT RELEASE message to inform the source gNB about the success of the handover.

In step S420, the source gNB releases radio and C-plane related resources associated to the UE context in response to receiving the UE CONTEXT RELEASE message.

Figure 5A:
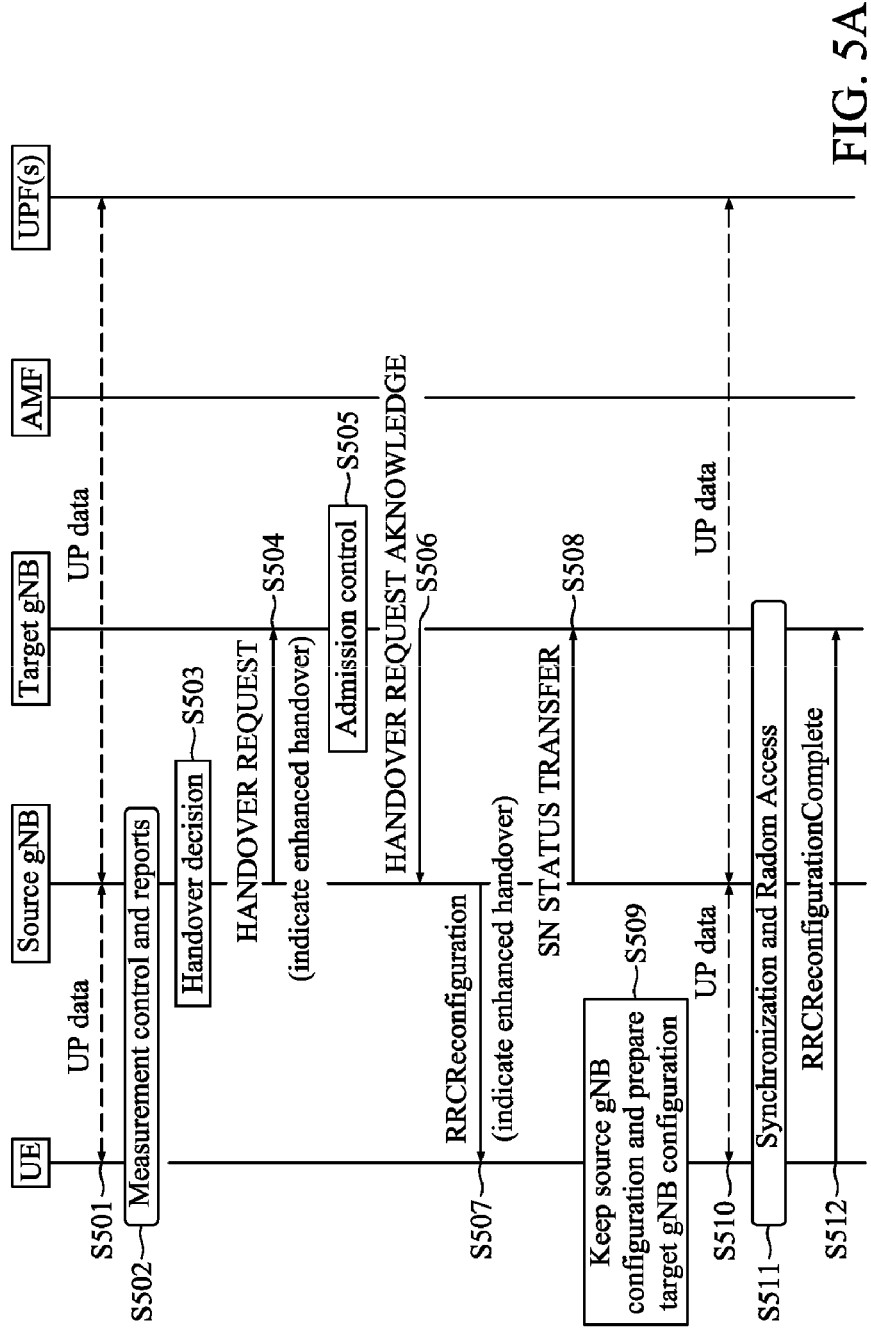
FIGS. 5A and 5B show a message sequence chart illustrating an enhanced handover procedure according to an embodiment of the application.
Figure 5B:
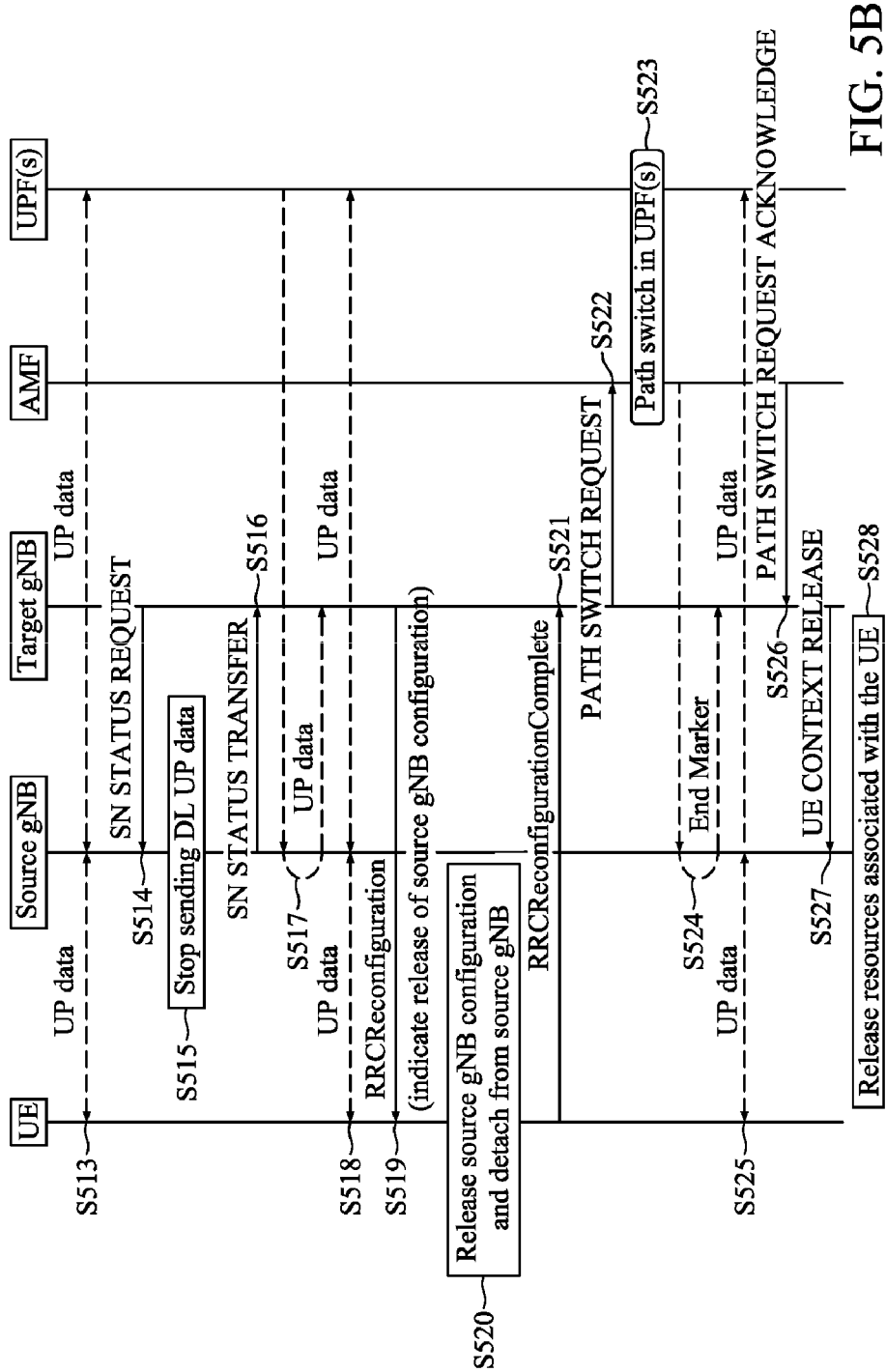

FIGS. 5A and 5B show a message sequence chart illustrating an enhanced handover procedure according to an embodiment of the application.

In this embodiment, the enhanced handover method is applied to a 5G mobile communication environment.

In step S501, a UE (e.g., the UE 110) is initially registered to a 5G NR network (e.g., the service network 120) and is sending and/or receiving UP data to and/or from the 5G NR network via the source gNB (e.g., the cellular station 121-A/121-B).

In step S502, the source gNB configures the UE to perform measurements on the serving gNB and neighboring gNBs, and the UE reports the measurement results to the source gNB according to the measurement configuration.

In step S503, the source gNB decides to initiate a handover of the UE, based on the measurement report received from the UE and the RRM information.

In step S504, the source gNB sends a Handover Request message to the target gNB. Specifically, the Handover Request message may include information indicating that the handover is an enhanced handover, in contrast to the conventional handover.

In addition, the Handover Request message may include other information that is necessary for the target gNB to prepare the handover. For example, the necessary information may include at least the target cell ID, KgNB (node key), the Cell-Radio Network Temporary Identifier (C-RNTI) of the UE in the source gNB, RRM-configuration including UE inactive time, basic Access Stratum (AS)-configuration including antenna Info and DL Carrier Frequency, the current Quality of Service (QoS) flow to Data Radio Bearer (DRB) mapping rules applied to the UE, the minimum system information from source gNB, the UE capabilities for different Radio Access Technologies (RATs), Protocol Data Unit (PDU) session related information, and optionally the UE reported measurement information including beam-related information (if available).

In step S505, the target gNB may perform admission control. Slice-aware admission control shall be performed if the slice information is sent to the target gNB. If the PDU sessions are associated with non-supported slices the target gNB shall reject such PDU sessions.

In step S506, the target gNB prepares the handover and sends a HANDOVER REQUEST ACKNOWLEDGE message to the source gNB, which includes a transparent container to be sent to the UE as an RRC message to perform the handover.

In step S507, the source gNB initiates a handover of the UE by sending a handover command message to the UE.

In this embodiment, the handover command message is an RRCReconfiguration message which includes information indicating that the handover is an enhanced handover, in contrast to a conventional/legacy handover.

The RRCReconfiguration message may further include information required to access the target cell, such as the target cell ID, the new C-RNTI, the target gNB security algorithm identifiers for the selected security algorithms, a set of dedicated Random Access Channel (RACH) resources, the association between RACH resources and Synchronization Signal Blocks (SSBs), the association between RACH resources and UE-specific Channel State Information-Reference Signal (CSI-RS) configuration(s), common RACH resources, and target cell System Information Blocks (SIBs), etc.

In another embodiment, the handover command message may be an RRCConnectionReconfiguration message if the service network is a 4G LTE-based network, and the RRCConnectionReconfiguration message may include information indicating that the handover is an enhanced handover.

In step S508, the source gNB sends an SN STATUS TRANSFER message to the target gNB.

In step S509, the UE keeps the configuration of the source gNB (including the radio resource configuration of the source gNB) and prepares the configuration of the target gNB.

In step S510, the UE continues to send and/or receive UP data to and/or from the source gNB. That is, during the handover execution phase, the source gNB continues to send and/or receive UP data to and/or from the UE, and the service delay experienced by the UE may be less than 1 ms (so the enhanced handover is also called "0 ms handover").

In step S511, the UE synchronizes to the target gNB and perform a random access procedure with the target gNB.

In step S512, the UE completes the handover procedure by sending a handover complete message to the target gNB.

In this embodiment, the handover complete message is an RRCReconfigurationComplete message, and the connection between the UE and the target gNB may be considered as being established when the target gNB receives the RRCReconfigurationComplete message.

In another embodiment, the handover complete message may be an RRCConnectionReconfigurationComplete message if the service network is a 4G LTE-based network.

In step S513, the UE continues to send and/or receive UP data to and/or from the source gNB after sending the handover complete message.

In step S514, the target gNB sends an SN STATUS REQUEST message to the source gNB to get the SN status information.

In step S515, the source gNB stops sending DL UP data received from the core network to the UE in response to receiving the SN STATUS REQUEST message.

In step S516, the source gNB sends an SN STATUS TRANSFER message including the SN status information to the target gNB. Specifically, the SN status information may include the Packet Data Convergence Protocol (PDCP) SN and Hyper Frame Number (HFN) for all the bearers that are being transferred to target gNB.

In step S517, the source gNB starts forwarding the DL UP data received from the core network to the target gNB in response to sending the SN STATUS TRANSFER message.

In step S518, the UP data delivery to and from the UE is switched to be performed by the target gNB. That is, the UE starts sending and/or receiving UP data to and/or from the target gNB.

Please note that, upon reception of the DL UP data forwarded by the source gNB, the target gNB does not need to buffer the DL UP data and can send it to the UE immediately since the connection between the UE and the target gNB has been established.

In step S519, the UE receives an RRC request message from the target gNB.

In this embodiment, the RRC request message is an RRCReconfiguration message which includes information indicating the UE to release the configuration of the source gNB.

In another embodiment, the RRC request message may be an RRCConnectionReconfiguration message if the service network is a 4G LTE-based network, and the RRCConnectionReconfiguration message may include information indicating the UE to release the configuration of the source gNB.

In step S520, the UE releases the configuration of the source gNB and detaches from the source gNB in response to receiving the RRC request message.

In step S521, the UE sends an RRC response message to the target gNB.

In this embodiment, the RRC response message is an RRCReconfigurationComplete message.

In another embodiment, the RRC response message may be an RRCConnectionReconfigurationComplete message if the service network is a 4G LTE-based network.

In step S522, the target gNB sends a PATH SWITCH REQUEST message to AMF to trigger the core network to switch the DL data path towards the target gNB and to establish an NG-C interface instance towards the target gNB.

In step S523, the core network entities, such as the AMF and UPF, switches the DL data path towards the target gNB.

In step S524, the AMF sends one or more "end marker" packets on the old path to the source gNB which further forwards the "end marker" packets to the target gNB.

Specifically, the core network may release any U-plane/Transport Network Layer (TNL) resources towards the source gNB after sending the "end marker" packets.

In step S525, the UP data delivery between the UE and the core network is performed via the target gNB.

In step S526, the AMF confirms the PATH SWITCH REQUEST message with a PATH SWITCH REQUEST ACKNOWLEDGE message to the target gNB.

In step S527, upon reception of the PATH SWITCH REQUEST ACKNOWLEDGE message from the AMF, the target gNB sends a UE CONTEXT RELEASE message to inform the source gNB about the success of the handover.

In step S528, the source gNB releases radio and C-plane related resources associated to the UE context in response to receiving the UE CONTEXT RELEASE message.

In view of the forgoing embodiments, it should be appreciated that the present application improves the handover procedure by allowing the source cellular station to continue to send and/or receive UP data to and/or from the UE during the handover execution phase. Advantageously, the service interruption caused by the handover may be significantly reduced for the UE, and user experience may be improved.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The invention claimed is:

1. A User Equipment (UE), comprising:
a wireless transceiver, configured to perform wireless transmission and reception to and from a first cellular station and a second cellular station; and
a controller, configured to continue to send or receive User Plane (UP) data to or from the first cellular station via the wireless transceiver after receiving a handover command message for a handover of the UE from the first cellular station to the second cellular station, receive a Radio Resource Control (RRC) request message from the second cellular station via the wireless transceiver after sending a handover complete message to the second cellular station, and detach from the first cellular station in response to receiving the RRC request message.

2. The UE of claim 1, wherein the handover command message comprises information indicating that the handover is an enhanced handover.

3. The UE of claim 1, wherein the controller is further configured to keep configuration of the first cellular station in response to receiving the handover command message.

4. The UE of claim 1, wherein the RRC request message comprises information indicating the UE to release configuration of the first cellular station, and the controller is further configured to release the configuration of the first cellular station and send an RRC response message to the second cellular station via the wireless transceiver in response to receiving the RRC request message.

5. The UE of claim 1, wherein the controller is further configured to send or receive UP data to or from the second cellular station via the wireless transceiver after sending the handover complete message and before receiving the RRC request message.

6. The UE of claim 1, wherein the handover command message and the handover complete message are an RRCReconfiguration message and an RRCReconfigurationComplete message, respectively, when the communications between the UE and the first and second cellular stations are in compliance with a 5G New Radio (NR) technology; or the handover command message and the handover complete message are an RRCConnectionReconfiguration message and an RRCConnectionReconfigurationComplete message, respectively, when the communications between the UE and the first and second cellular stations are in compliance with a 4G Long Term Evolution-based (LTE-based) technology.

7. An enhanced handover method for a User Equipment (UE), comprising:
continuing to send or receive User Plane (UP) data to or from a first cellular station after receiving a handover command message for a handover of the UE from the first cellular station to a second cellular station;
receiving a Radio Resource Control (RRC) request message from the second cellular station after sending a handover complete message to the second cellular station; and
detaching from the first cellular station in response to receiving the RRC request message.

8. The enhanced handover method of claim 7, wherein the handover command message comprises information indicating that the handover is an enhanced handover.

9. The enhanced handover method of claim 7, further comprising:
keeping configuration of the first cellular station in response to receiving the handover command message.

10. The enhanced handover method of claim 7, wherein the RRC request message comprises information indicating the UE to release configuration of the first cellular station, and the enhanced handover method further comprises:
releasing the configuration of the first cellular station and sending an RRC response message to the second cellular station in response to receiving the RRC request message.

11. The enhanced handover method of claim 7, further comprising:
sending or receiving UP data to or from the second cellular station after sending the handover complete message and before receiving the RRC request message.

12. The enhanced handover method of claim 7, wherein the handover command message and the handover complete message are an RRCReconfiguration message and an RRCReconfigurationComplete message, respectively, when the communications between the UE and the first and second cellular stations are in compliance with a 5G New Radio (NR) technology; or the handover command message and the handover complete message are an RRCConnectionReconfiguration message and an RRCConnectionReconfigurationComplete message, respectively, when the communications between the UE and the first and second cellular stations are in compliance with a 4G Long Term Evolution-based (LTE-based) technology.

13. A cellular station, serving as a source cellular station for a handover of a User Equipment (UE) to a target cellular station, comprising:
- a wired transceiver, configured to provide wired communications with the target cellular station and a core network;
- a wireless transceiver, configured to perform wireless transmission and reception to and from the UE; and
- a controller, configured to continue to send or receive User Plane (UP) data to or from the UE via the wireless transceiver after sending a handover command message to the UE, and stop sending Downlink (DL) UP data received from the core network to the UE in response to receiving a Sequence Number (SN) status request message from the target cellular station via the wired transceiver.

14. The cellular station of claim 13, wherein the controller is further configured to send an SN status transfer message to the target cellular station via the wired transceiver in response to receiving the SN status request message, and forward the DL UP data received from the core network to the target cellular station via the wired transceiver in response to sending the SN status transfer message.

15. The cellular station of claim 13, wherein, prior to sending the handover command message to the UE, the controller is further configured to send a handover request message to the target cellular station via the wired transceiver, and receive a handover request acknowledgement message from the target cellular station via the wired transceiver.

* * * * *